United States Patent [19]

Hahn et al.

[11] Patent Number: 4,783,982

[45] Date of Patent: Nov. 15, 1988

[54] APPARATUS AND METHOD FOR TRIMMING A CAN BODY

[75] Inventors: Roger A. Hahn, Arvada; Robert H. Schultz, Broomfield, both of Colo.

[73] Assignee: Adolph Coors Company, Golden, Colo.

[21] Appl. No.: 102,115

[22] Filed: Sep. 29, 1987

Related U.S. Application Data

[63] Continuation-in-part of Ser. No. 830,364, Feb. 18, 1986, abandoned.

[51] Int. Cl.⁴ ............................................. B21D 28/18
[52] U.S. Cl. ........................................ 72/55; 72/324; 83/180; 83/542; 413/76
[58] Field of Search ................... 83/178, 180, 542; 72/54, 55, 58, 61, 62, 324, 325, 349, 348; 413/55, 73, 76, 78

[56] References Cited

U.S. PATENT DOCUMENTS

| | | | |
|---|---|---|---|
| 2,229,393 | 1/1941 | Steffen | 83/178 |
| 2,423,862 | 7/1947 | Vorobik | 72/54 |
| 2,966,872 | 1/1961 | Schmocker | 72/55 |
| 3,295,347 | 1/1967 | Fuessle et al. | 83/178 |
| 3,564,884 | 2/1971 | Hinshaw | 72/57 |
| 3,953,994 | 5/1976 | Brawner et al. | 72/58 |
| 4,006,619 | 2/1977 | Anderson | 72/58 |
| 4,030,432 | 6/1977 | Miller et al. | 413/69 |
| 4,388,752 | 6/1983 | Vinciguerra et al. | 72/58 |

FOREIGN PATENT DOCUMENTS

| | | | |
|---|---|---|---|
| 2706400 | 8/1977 | Fed. Rep. of Germany | 72/61 |
| 56121 | 3/1982 | Japan | 72/62 |
| 740413 | 6/1980 | U.S.S.R. | 83/178 |
| 1007860 | 3/1983 | U.S.S.R. | 72/275 |
| 1411321 | 10/1975 | United Kingdom | 83/180 |

OTHER PUBLICATIONS

Patent Abstract 173,293, "Method of and Apparatus for Expanding Thin-Walled Metal Cups and the Like", Joseph Martin, 1/13/1953.

*Primary Examiner*—David Jones
*Attorney, Agent, or Firm*—Klaas & Law

[57] ABSTRACT

A system for trimming a can body wherein a can body is positioned within a cutting member so that the cutting member is at the location where the can body is to be trimmed. A resilient, deformable object is inserted into the can body and positioned therein so that at least a portion thereof is located radially opposite portions of the can body on each side of the cutting member. The resilient, deformable object is deformed so as to move a first part thereof against a portion of the can body to prevent longitudinal movement of the can body and then to move a second part thereof against the portion of the can body located between the cutting member and the open end of the can body in a radially outward direction so as to sever that portion from the can body.

21 Claims, 10 Drawing Sheets

APPARATUS AND METHOD FOR TRIMMING A CAN BODY

This application is a continuation-in-part application of U.S. patent application Ser. No. 830,364 filed Feb. 18, 1986, now abandoned.

FIELD OF THE INVENTION

This invention relates generally to the manufacture of can bodies for use as containers, such as beverage containers, and more particularly to the portion of the manufacturing operation wherein the end of the can body is trimmed to form a can body of proper dimensions.

BACKGROUND OF THE INVENTION

In the manufacture of cans for use as containers, such as beverage containers and particularly when the cans are formed from aluminum, the manufacturing processes generally employed produce a can body which at one stage has a longitudinal length greater than that desired for future operations to form a finished can body ready to receive an end cap. Also, the top edge portions of the can bodies are irregularly shaped. Therefore, it is necessary that a portion of the sidewall of the can body be removed so as to produce a can body having a proper longitudinal length. The most conventional methods for trimming a portion of the can body utilize knives or cutting edges in various ways in which there is relative rotation between the can body and the cutting edge. Although these methods are used in commercial operations, there are problems associated with these methods, many of which are associated with the relative rotation between the can body and the cutting edge.

BRIEF DESCRIPTION OF THE INVENTION

This invention provides apparatus and method for trimming away a portion of a can body adjacent the open can end. In accordance with the invention, a can body is positioned within a cutting edge so that the cutting edge is located adjacent to the circle along which the can body is to be trimmed, which circle is spaced a distance away from the open end of the can body. A resilient, deformable object, formed from a material such as urethane or other similar materials, is positioned within the can body with at least a portion thereof located radially opposite said cutting edge. A force is applied to the resilient, deformable object so as to deform said resilient, deformable object in a radially outward direction so as to move the portion of the can body between the circle and the open end of the can body in a radially outward direction so as to sever the portion from the can body.

In a preferred embodiment of the invention, a conventional starwheel having a plurality of spaced apart work stations located around its circumference is rotated about an axis so that an untrimmed can body enters one work station at one location and exits as a trimmed can from the same work station at another location. As the starwheel rotates, the can body and the associated apparatus in each work station are moved through a series of operations so as to sever the portion away from the can body. Each untrimmed can body is fed into a starwheel work station and positioned on a vacuum chuck locator. A cutting member is mounted in a fixed position in each work station. As the work station rotates, means are provided to move the can body into and out of a location within the cutting member at which location the cutting member is radially opposite a circle along which the can body is to be trimmed. Means are provided on each work station for mounting a resilient, deformable object so that it may be moved into and out of a location within the can body as the work station is rotated whereat at least a portion of the resilient, deformable object is radially opposite the cutting member. As the work station rotates, means are provided to apply a force on the resilient, deformable object so as to deform at least a portion of the resilient, deformable object radially outward into contact with the adjacent inner surface of the can body. A first part of the resilient, deformable object contacts a portion of the can body so as to prevent longitudinal movement of the can body. Sufficient forces are continued to be applied to deform the resilient, deformable object so that a second part thereof moves against the portion of the can body between the circle and the open end and that portion is moved in a radially outward direction so that the cutting member severs the portion away from the can body.

It is an object of this invention to provide a system for trimming away a portion of an untrimmed can body adjacent the open end thereof wherein there is substantially no relative rotational movement between the can body and a cutting member It is another object of this invention to provide a system for trimming away a portion of an untrimmed can body adjacent the open end thereof that ensures that the trimmed open end of the can body is substantially perfectly round.

Additional objects, advantages, and novel features of the invention are set forth in part in the description which follows which will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 9A is an enlarged view of a portion of the cutting member;

DETAILED DESCRIPTION OF THE INVENTION

Figure 1:
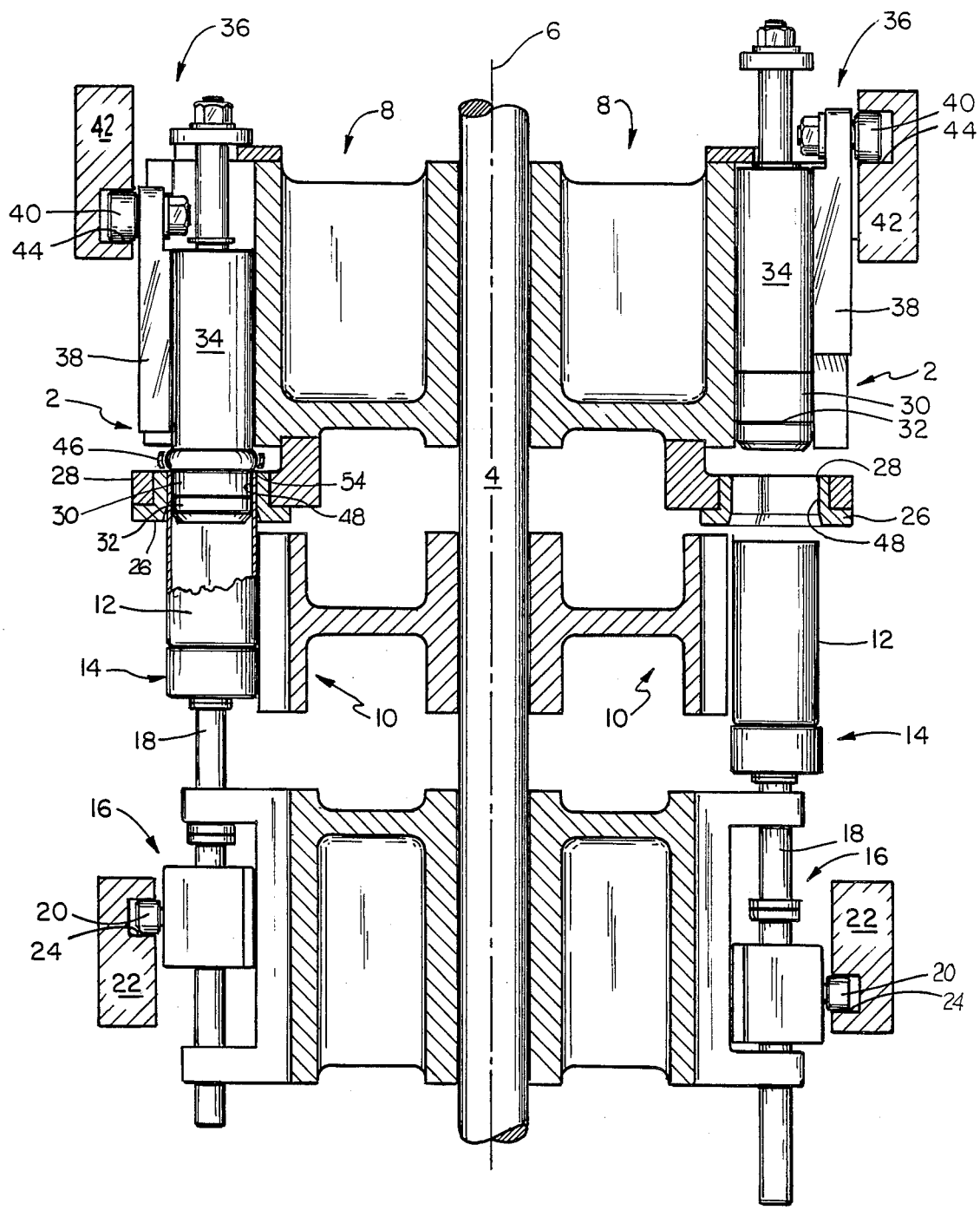
FIG. 1 is a schematic illustration of one embodiment of the invention.

One embodiment of the invention is schematically illustrated in FIG. 1 and comprises a starwheel 2 secured to a shaft 4 for rotation therewith around the longitudinal axis 6 of the shaft 4. In FIG. 1, the longitudinal axis 6 extends in the vertical direction but it is understood that this is for illustration purposes only and that the longitudinal axis 6 may extend in other directions within the spirit of this invention. The starwheel 2 has a plurality of circumferentially spaced apart work stations 8, generally about eight in number (not shown). Each work station 8 has pocket means 10 for receiving a can body 12 and a vacuum chuck can locator means 14. Means 16 are provided for reciprocating the vacuum chuck can locator means 14 and therefore the can body 12 in directions generally parallel to the longitudinal axis 6 of the shaft 4. The means 16 comprises a shaft 18 secured to the vacuum chuck can locator 14, a rotatable cam follower 20 mounted on the shaft 18 and a barrel cam 22 having a cam surface 24 for guiding the movement of the rotatable cam follower 20. A cutting member 26 having a cutting edge 28 is secured in a fixed position on each work station 8.

A resilient, deformable object 30 is mounted in a recess 32 formed in an elongated member 34. Means 36 are provided for reciprocating the elongated member 34 in directions generally parallel to the longitudinal axis 6 of the shaft 4. The means 36 comprises a member 38 secured to the elongated member 34, a rotatable cam follower 40 mounted on the member 38 and a barrel cam 42 having a cam surface 44 for guiding the movement of the rotatable cam follower 40. Means, to be described below, are provided to apply a force to the resilient, deformable object 30 so as to deform the resilient, deformable object 30 in a radially outward direction. As illustrated on the left hand side of FIG. 1, the resilient, deformable object 30 has been deformed radially outward a sufficient distance so as to sever the portion 46 away from the can body 12. Also, as the resilient, deformable body 30 is deformed radially outward, it moves a portion of the can body into contact with the cylindrical inner surface 48 of the cutting member 26 so as to restrain movement of the remaining portion of the can body 12 during the trimming operation and to ensure that the open end 50 of the trimmed can body 12 is substantially perfectly round. After the portion 46 has been severed, the starwheel continues to rotate and moves the work station to a location (not shown) where the trimmed portion 46 is removed and to another location (not shown) where the trimmed can body is transferred to a conveyor for further processing.

Figures 2, 3:
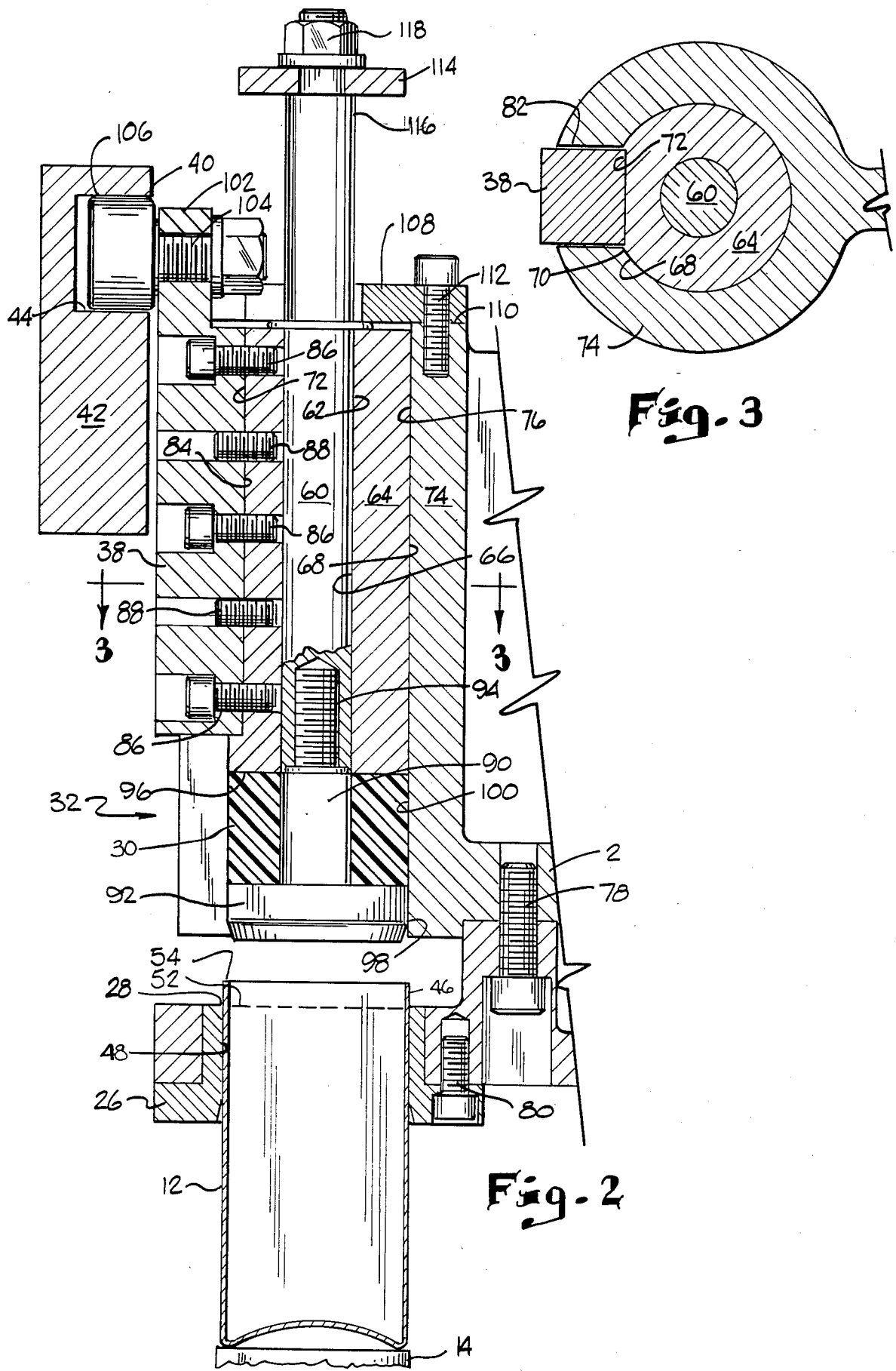
FIGS. 2, 4 and 5 are enlarged elevational views with parts in section illustrating the relative location of the various parts of the apparatus at different stages of the trimming operation.
FIG. 3 is a cross-sectional view along the line 3—3 of FIG. 2.

In FIG. 2, there is illustrated the location of various parts of the apparatus after the means 16 has moved the vacuum chuck can locator 14 and, therefore, the can body 12 into a location within the cutting member 26 so that the trimming operation may be performed thereon. A circle 52 along which the untrimmed can body 12 is to be trimmed is radially opposite the cutting edge 28 of the cutting member 26. The elongated member 34 comprises an elongated rod 60 having a cylindrical outer surface 62 and is located within a sleeve 64 having a cylindrical inner surface 66. The cylindrical outer surface 62 and the cylindrical inner surface 66 are dimensioned so as to have a frictional fit therebetween so that the sleeve 64 will move with the rod 60, but also, when the frictional force is overcome, may move relative to the rod 60. The sleeve 64 has a cylindrical outer surface 68 except for a longitudinally extending groove 70 having a planar bottom surface 72. The sleeve 64 is located within a cylinder 74 having a cylindrical inner surface 76. The cylinder 74 is secured to the starwheel 2 by a threaded fastener 78. Also, the cutting member 26 is secured to the starwheel 2 by a threaded fastener 80. The cylinder 74 has a longitudinally extending opening 82 therein and in which the member 38 is located for reciprocal movement therein. The member 38 has a surface 84 in contact with the bottom surface 72 of the sleeve 64 and is secured to the sleeve 64 by a plurality of fasteners 86 and dowels 88.

A stud 90 having an enlarged head 92 is secured in the bottom portion of the rod 60 by a threaded fastener 94. The enlarged head 92 is spaced from the bottom surface 96 of the sleeve 64 so as to form the recess 32. The enlarged head 92 has a cylindrical outer surface 98 having a diameter substantially the same as the diameter of the cylindrical outer surface 68 of the sleeve 64. A resilient, deformable object 30, preferably formed from urethane, is located in the recess 32. The resilient, deformable object 30 has an outer cylindrical surface 100 having a diameter substantially the same as the diameters of the sleeve 64 and the enlarged head 92. The rotatable cam follower 40 is secured to the upper portion 102 of the member 38 by a threaded fastener 104. The rotatable cam follower 40 has a cylindrical surface 106 so that it may rotate over the cam surface 44 in the barrel cam 42.

The cylinder 74 has a stop member 108 secured to the upper surface 120 thereof by a threaded fastener 112. The elongated rod 60 is provided with a stop collar 114 secured to its upper end 116 by a threaded fastener 118. The stop collar 114 and the stop member 108 limit the downward movement of the elongated rod 60 for a purpose to be described below.

Figure 4:
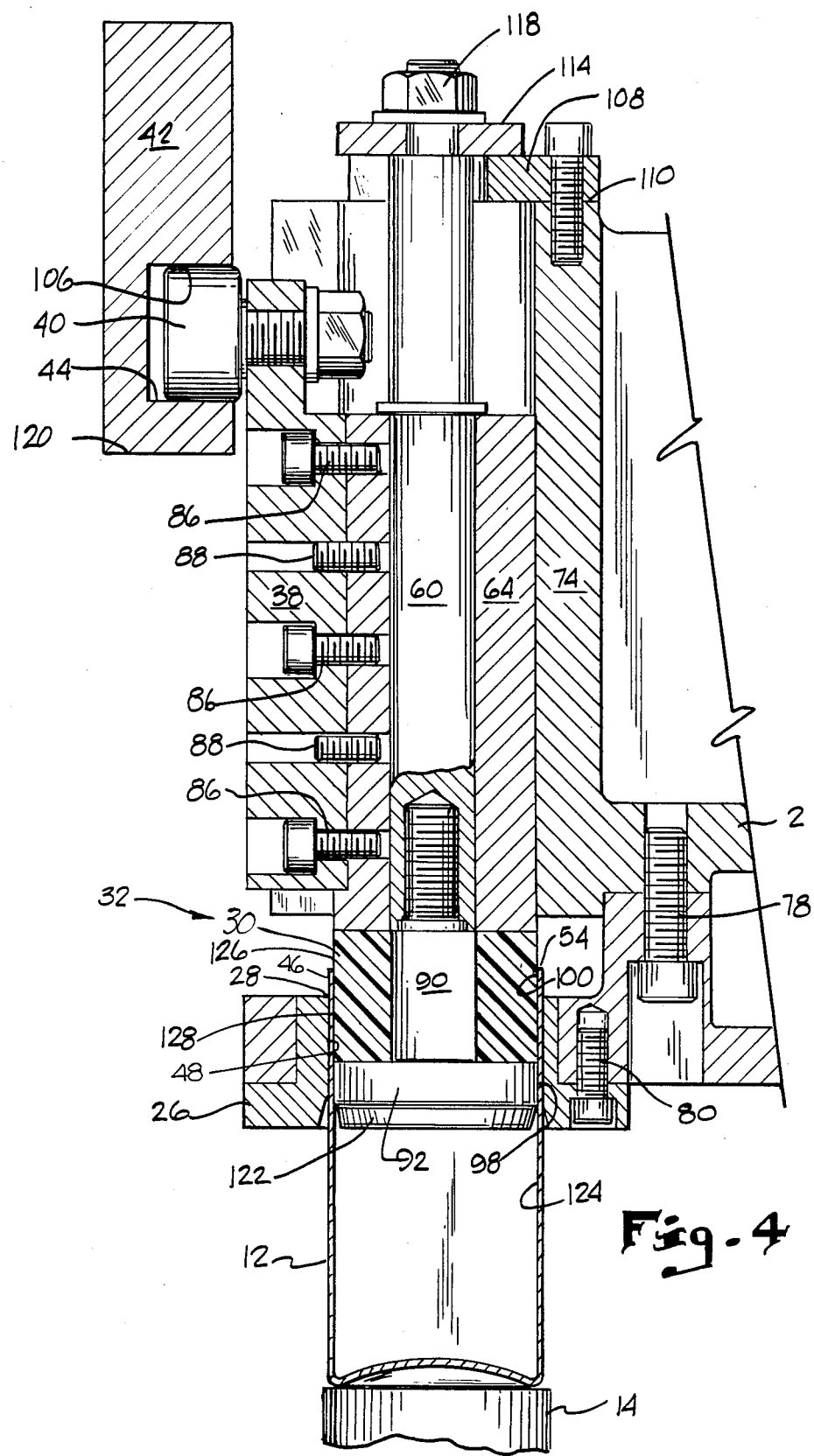

The relative location of the various parts as illustrated in FIG. 4, occurs during the rotation of each work station 8 from the right side of FIG. 1 to the left side of FIG. 1. As illustrated in FIG. 4, the cam surface 44 is now located closer to the bottom 120 of the barrel cam 42. The rotatable cam follower 40 has moved the member 38 and, therefore, the sleeve 64 and the rod 60 downwardly in the cylinder 74. The enlarged head 92 has been moved downwardly to a location within the can body 12. The enlarged head 92 is provided with an inclined surface 122 to ensure entry into the can body 12. The cylindrical outer surface 98 of the enlarged head 92 and the cylindrical outer surface 100 of the resilient, deformable object 30 are substantially in contact with the inner surface 124 of the can body 12. Portions 126 and 128 are located above and below the cutting head 28 in longitudinal directions so that a portion of the resilient, deformable object is radially opposite the cutting head 28. As illustrated in FIG. 4, stop collar 114 on the rod 60 has moved into contact with the stop member 108 on the cylinder 74 to stop the downward movement of the rod 60 and the enlarged head 92.

Figure 5:
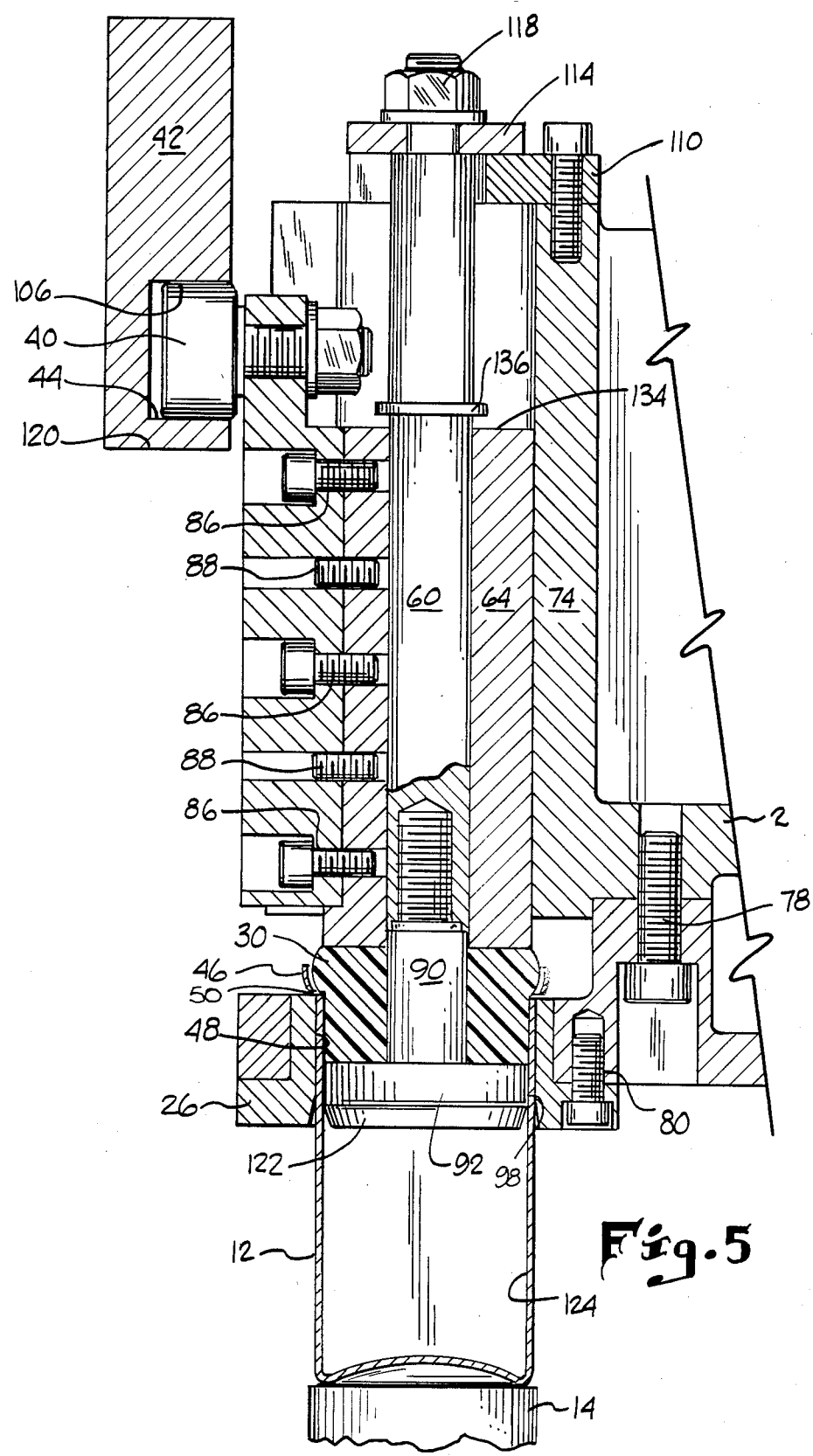

As the work station 8 continues to rotate from the location illustrated in FIG. 4 to the location illustrated in FIG. 5 and the left side of FIG. 1, the cam surface 44 continues to move downwardly toward the bottom 120 of the barrel cam 42. The force applied by the rotatable cam follower 40 on the member 38 is sufficient to overcome the frictional force between the rod 60 and the sleeve 64 so that the sleeve 64 moves downwardly relative to the rod 60 and the enlarged head 92. The continued downward movement of the sleeve 64 applies a force to the resilient, deformable object 30 and functions as control means so that the resilient, deformable object 34 starts to expand in a radially outward direction into contact with the inner surface 124 of the can body 12 and to apply a radially outward directed force thereto. The application of this force to the portion of the can body 12 between the resilient, deformable object 30 and the inner cylindrical surface 130 of the cutting member 26 functions to prevent any longitudinal movement of the can body 12. The continued downward movement of the sleeve 64 increases the deformation of the resilient, deformable object 30 to apply increasing amounts of radially outward directed force to the portion 46 of the can body between the circle 52 and the open end 54 so that the cutting edge 28 will sever that portion 46 away from the remaining portion of the can body 12 as illustrated in FIG. 5.

As the work station 8 continues to rotate, the cam surface 44 moves away from the bottom 120 of the barrel cam 42 so as to move the sleeve 64 upwardly as viewed in FIG. 5. The resilient characteristic of the resilient, deformable object 30 is sufficient to overcome the frictional force between the sleeve 64 and the elongated rod 60 so that the sleeve 64 moves relative to the elongated rod 60 so that the resilient, deformable object 30 returns to its original shape as illustrated in FIGS. 2 and 4. As the cam surface 44 continues to move away from the bottom 120 of the barrel cam 42, the relative movement of the sleeve 64 and the elongated rod 60 continues until the upper surface 134 of the sleeve 64 contacts the ring member 136 fixedly mounted on the elongated rod 60. After this contact has been made, the sleeve 64 and the elongated rod 60 move upwardly in unison.

As the work station continues to rotate from the left side of FIG. 1 back to the right side of FIG. 1, the rotatable cam follower 20 following the cam surface 24 of the barrel cam 22 moves the vacuum chuck can locator 14 downwardly so that the can body 12 is moved free from its location within the cutting member 26. The trimmed can body is transferred from the work station 8 by suitable means (not shown) to a conveyor for further processing. Also, as the can body 12 is being lowered out of its location within the cutting member 26, suitable means, such as an air nozzle (not shown), are provided to remove the trimmed portion 46 out of the work station and into a suitable scrap collector.

Figure 6:
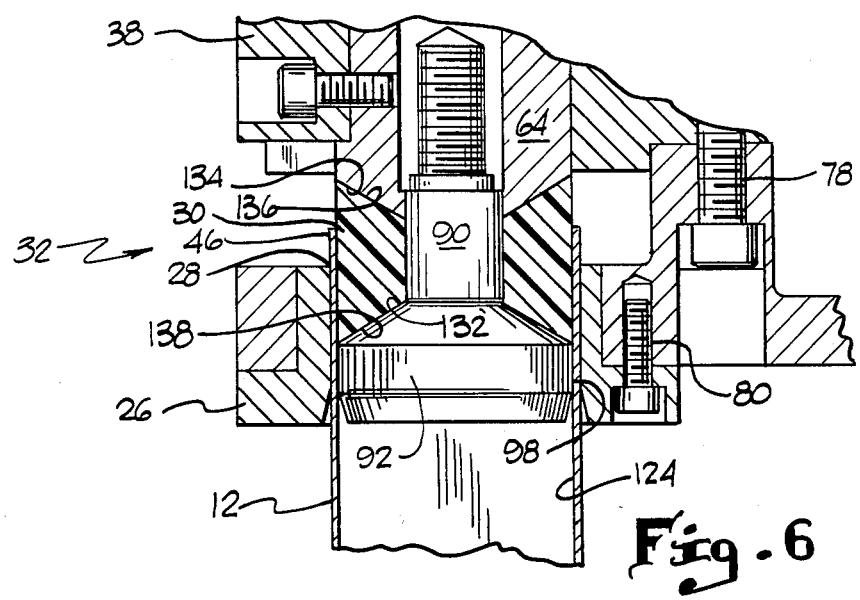
FIG. 6 is a cross-sectional view of another embodiment of the invention.

In the embodiment of the invention illustrated in FIG. 6, the upper surface 132 of the enlarged head 92 has a conical configuration with the smallest diameter thereof spaced away from the cylindrical surface 98. Also, the lower surface 134 of the sleeve 64 has a conical configuration with the smallest diameter thereof closer to the enlarged head 92. The resilient, deformable object 30 of this embodiment has a conically shaped upper surface 136 conforming to the conically shaped lower surface 134 of the sleeve 64 and a conically shaped lower surface 138 conforming to the conically shaped upper surface 132 of the enlarged head 92.

Figure 7:
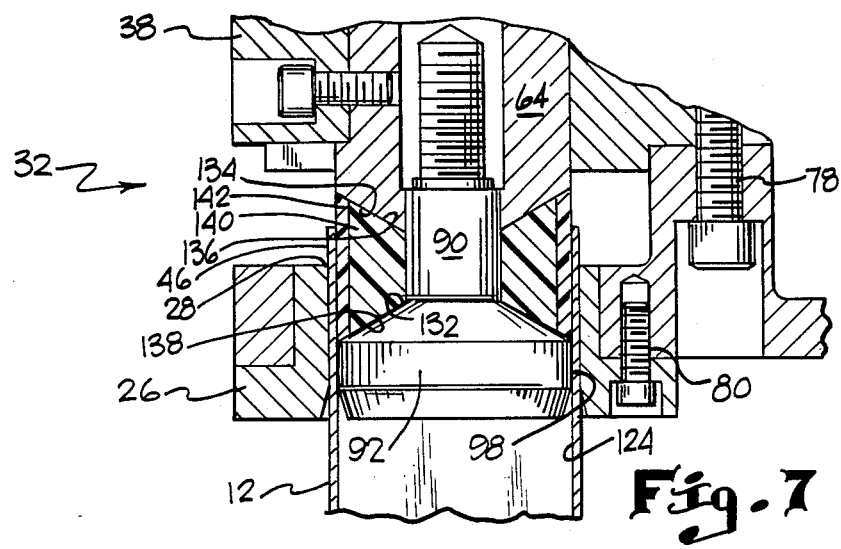
FIG. 7 is a cross-sectional view of a further embodiment of the invention.

The embodiment illustrated in FIG. 7 is similar to the embodiment of FIG. 6 except that the resilient, deformable body 30 is formed by two separate portions comprising an inner ring shaped portion 140 and an outer ring shaped portion 142.

The resilient, deformable object 30 in the embodiments illustrated in FIGS. 1–6 is formed from urethane having a durometer between about 85 to 95 Shore A and preferably of about 90 Shore A. In theeembodiment of FIG. 7, the inner ring shaped portion 140 is formed from urethane having a durometer between about 40 to 60 Shore A and preferably about 50 Shore A. The outer ring shaped portion is formed from urethane having a durometer of between about 85 to 95 Shore A and preferably of about 90 Shore A.

Figure 8:
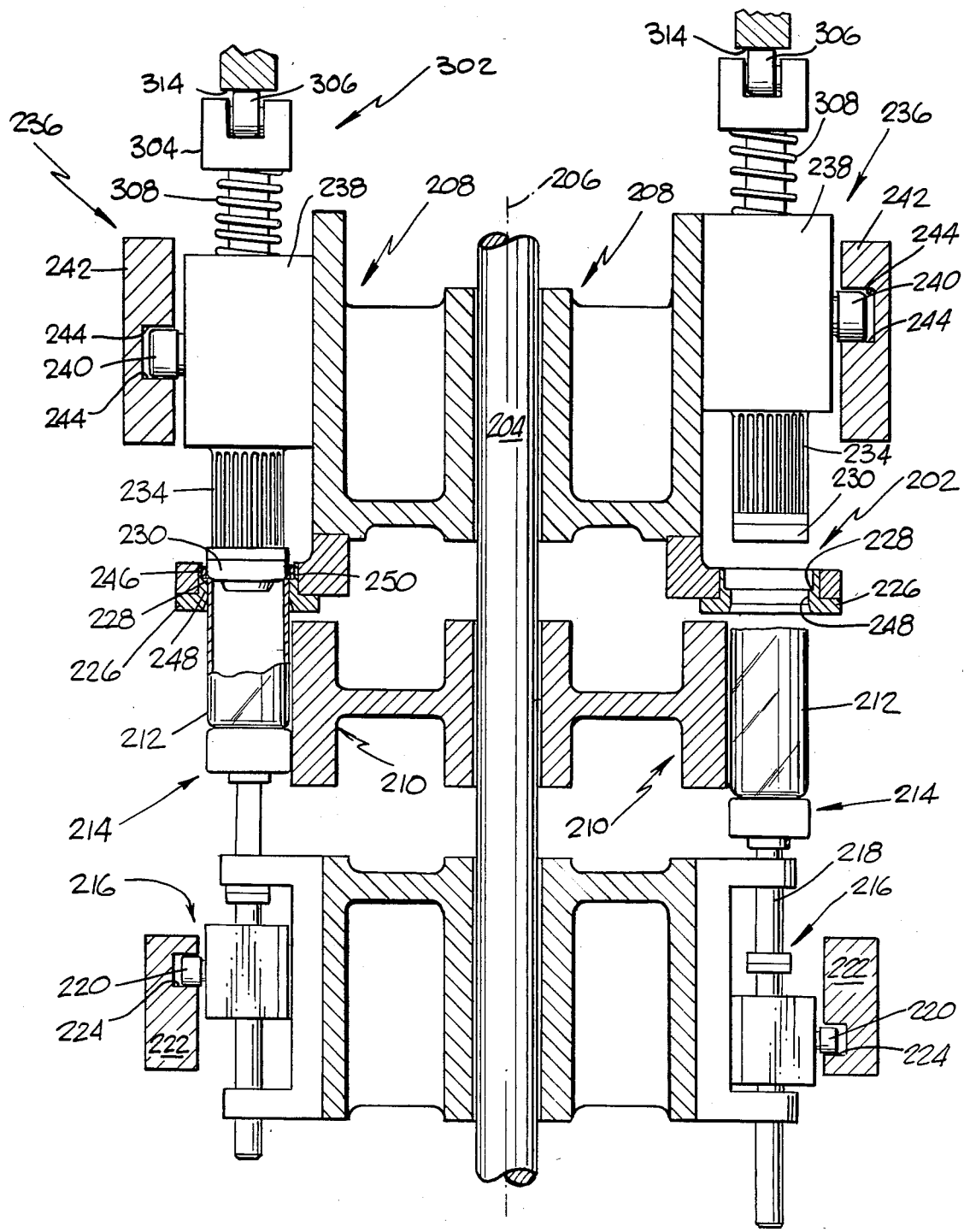
FIG. 8 is an illustration similar to FIG. 1 but illustrating a preferred embodiment of the invention.

A preferred embodiment of the invention is schematically illustrated in FIG. 8 and comprises a starwheel 202 secured to a shaft 204 for rotation therewith around the longitudinal axis 206 of the shaft 204. In FIG. 8, the longitudinal axis 206 extends in the vertical direction but it is understood that this is for illustration purposes only and that the longitudinal axis 206 may extend in other directions within the spirit of the invention. The starwheel 202 has a plurality of circumferentially spaced apart work stations 208, generally about eight in number (not shown). Each work station 208 has pocket means 210 for receiving a can body 212 and a vacuum chuck can locator means 214. Reciprocating means 216 are provided for reciprocating the vacuum chuck can locator means 214 and therefore the can body 212 in directions generally parallel to the longitudinal axis 206 of the shaft 204. The reciprocating means 216 comprise a shaft 218 secured to the vacuum chuck can locator 214, a rotatable cam follower 220 mounted on the shaft 218 and a barrel cam 222 having a cam surface 224 for guiding the movement of the rotatable cam follower 222. A cutting member 226 having a cutting edge 228 is secured in a fixed position on each work station 208.

A resilient, deformable object 230 is mounted on an elongated member 234. Reciprocating means 236 are provided for reciprocating the elongated member 234 in directions generally parallel to the longitudinal axis 206 of the shaft 204. The means 236 comprises a member 238 secured to the elongated member 234, a rotatable cam follower 240 mounted on the member 238 and a barrel cam 242 having cam surfaces 244 for guiding the movement of the rotatable cam follower 240. Means, to be described below, are provided to apply a force to the resilient, deformable object 230 so as to apply radially outwardly directed forces on the resilient, deformable object 230. As illustrated on the left hand side of FIG. 8, the resilient, deformable object 230 has been moved radially outward a sufficient distance so as to sever the portion 246 away from the can body 212. Also, as the resilient, deformable body 230 is deformed radially outward, it first moves a portion of the can body into contact with the cylindrical inner surface 248 of the cutting member 226 so as to restrain movement of the remaining portion of the can body 212 during the trimming operation and to ensure that the open end 250 of the trimmed can body 212 is substantially perfectly round. After the portion 246 has been severed, the starwheel continues to rotate and moves the work station to a location (not shown) where the trimmed portion 246 is removed and to another location (not shown) where the trimmed can body is transferred to a conveyor for further processing.

Figure 9:
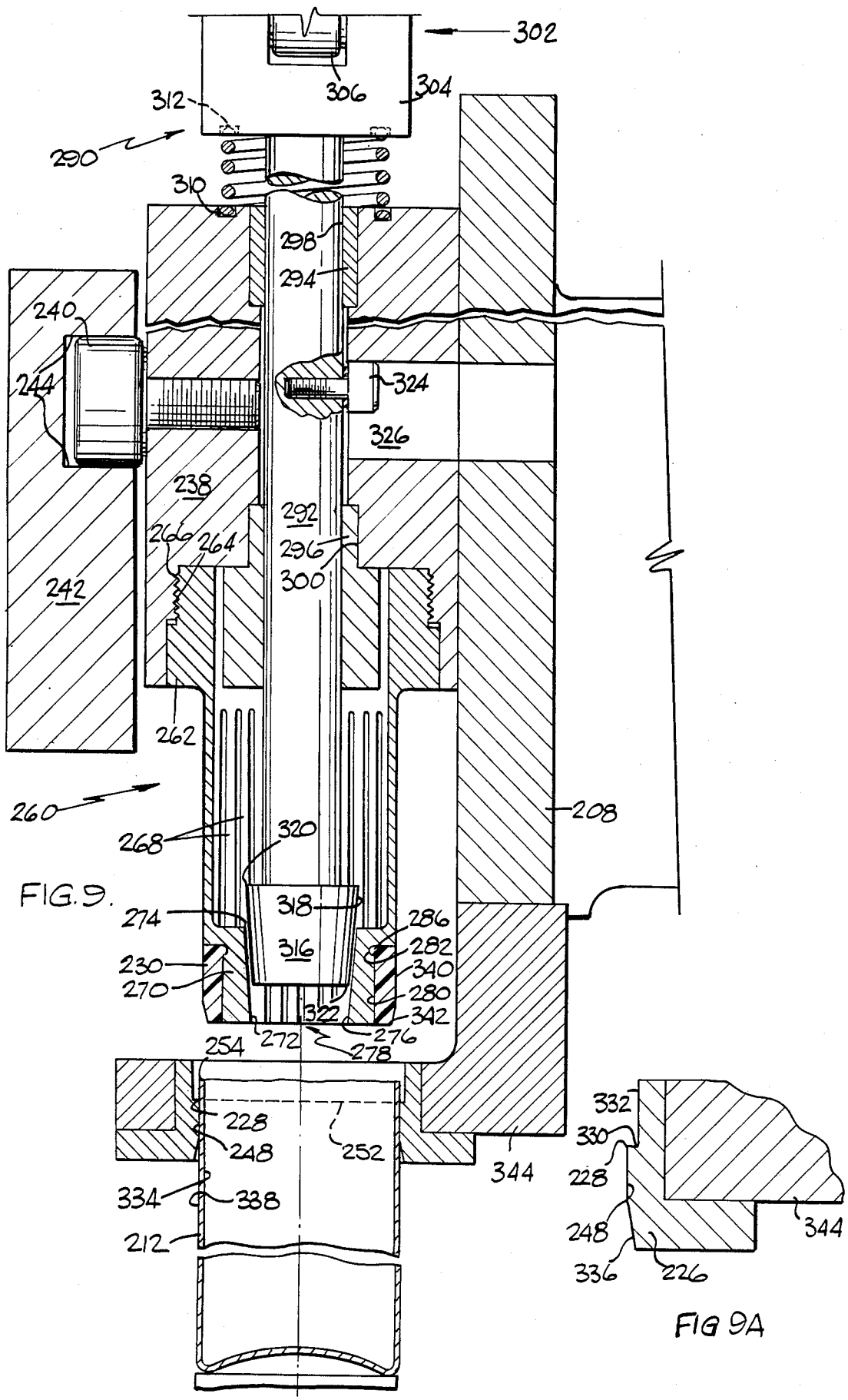
FIGS. 9, 10 and 11 are enlarged elevational views with parts in section illustrating the relative location of the various parts of the apparatus of FIG. 8 at different stages of the trimming operation.
Figure 12:
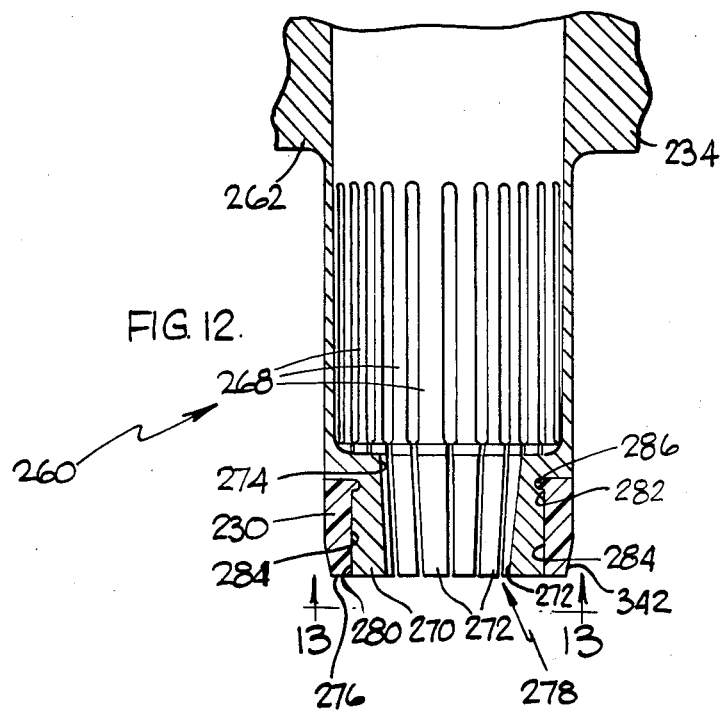
FIG. 12 is an enlarged elevational view with parts in section of the expandable means with a resilient, deformable object mounted thereon.
Figure 13:
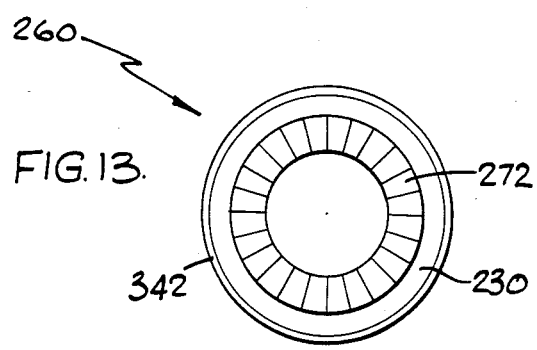
FIG. 13 is a bottom plan view of FIG. 12 in a non-expanded position.
Figure 14:
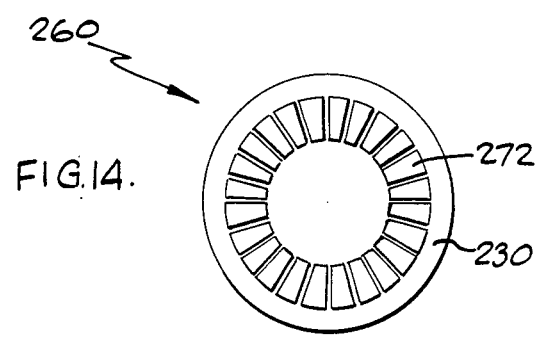
FIG. 14 is a bottom plan view of FIG. 12 in an expanded position.

In FIG. 9, there is illustrated the location of various parts of the apparatus after the means 216 has moved the vacuum chuck can locator 214 and, therefore, the can body 212 into a location within the cutting member 226 so that the trimming operation may be performed thereon. The resilient, deformable object 230 and the means for applying a force thereto are positioned above the can body 212. A circle 252 along which the untrimmed can body 212 is to be trimmed is radially opposite the cutting edge 228 of the cutting member 226 so that the portion of the can body to be trimmed away extends between the circle 252 and the open end 254 of the untrimmed can body 212. The elongated member 234, particularly illustrated in FIG. 12, comprises a hollow elongated expandable mandrel means 260 which in its operational position has a longitudinal axis parallel to the longitudinal axis 206. The expandable mandrel means 260 has a base member 262 having an externally threaded portion 264 for threaded engagement with an internally threaded portion 266 in the member 238. A plurality of movable fingers 268 project outwardly from the base member 262 in a longitudinal direction and are integral therewith. Each of the fingers 268 is relatively thin at its juncture with the base member 262 so as to be capable of pivotal movement relative to the base member 262. Each of the fingers 268 has an end portion 270 having an inner surface 272 that is a tapering arcuate surface so that, when the fingers 268 are in their non-expanded position, as illustrated in FIG. 12 and 13, the end portions 270 are in contact with each other so that the inner surfaces 272 thereof form a generally conical surface having its larger diameter 274 closer to the base member 262 and its smaller diameter 276 at the open end 278 of the expandable mandrel means 260. The outer surface of each finger 268 has a generally cylindrical portion 280 and a recessed portion 282 that is an arcuate surface so that when the fingers 268 are in their non-expanded position, as illustrated in FIG. 12, the recessed portions 282 form an annular groove. As illustrated in FIG. 12, the resilient, deformable object 230 has an inner surface having a generally cylindrical portion 284 for mating engagement with the generally cylindrical portions 280 and a continuous annular rib portion 286 projecting radially inwardly and seated in the annular groove formed by the recessed portions 282 so as to retain the resilient, deformable object 230 on the elongated member 234.

Figure 10:
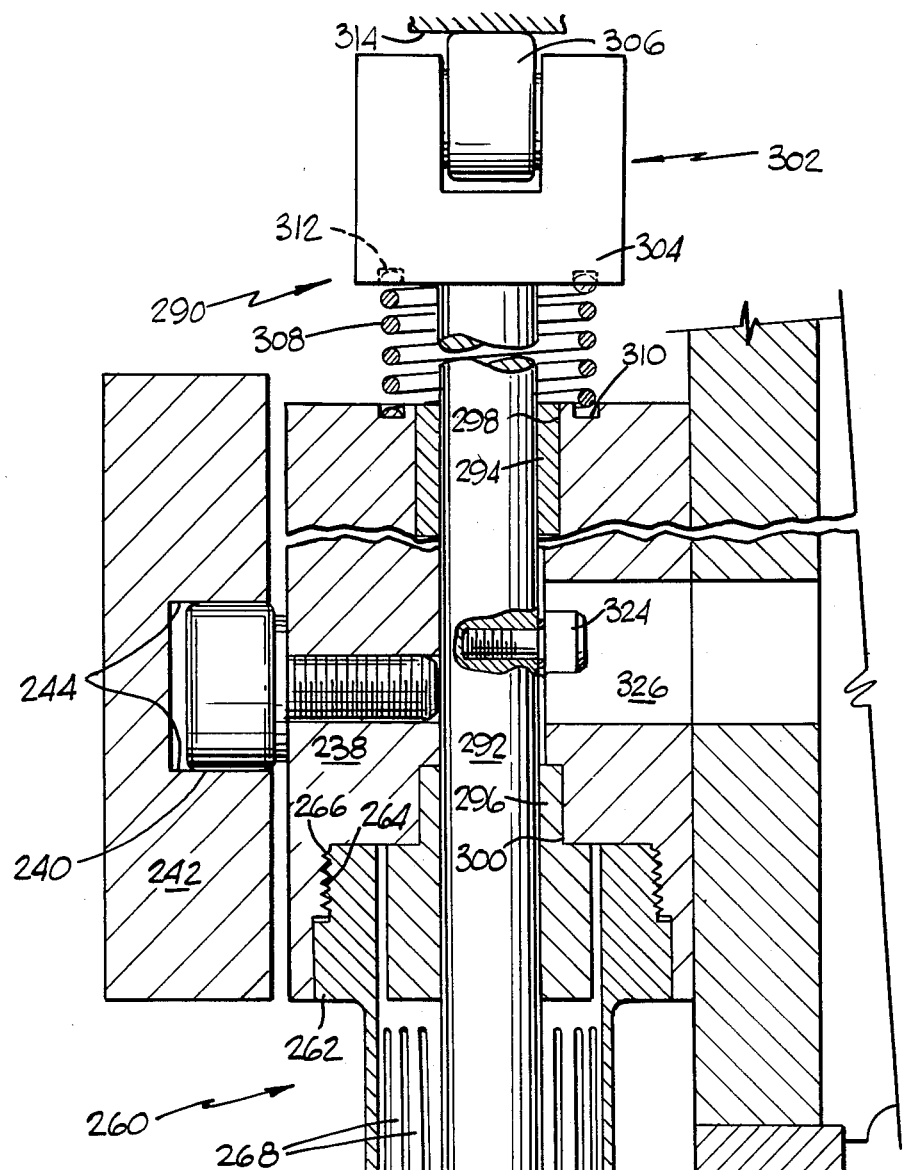
Figure 11:
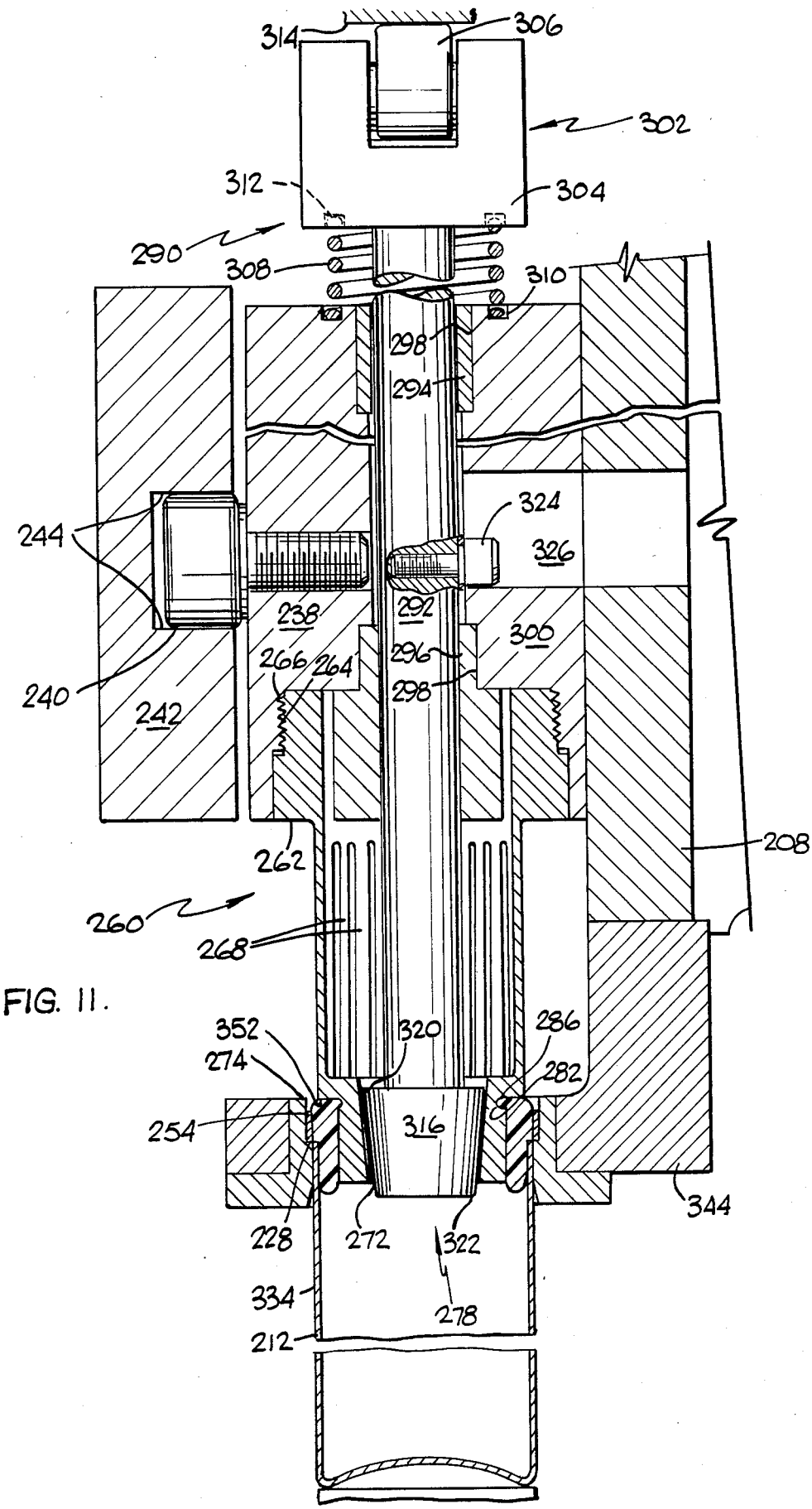

A force applying means 290 is illustrated in FIGS. 9-11 and comprises an elongated shaft means 292 which is slidably mounted in spaced apart bushings 294 and 296 which are press fitted into openings 298 and 300 in member 238. The elongated shaft means 292, when in its operating position, has a longitudinal axis which is parallel to the longitudinal axis 206. Movement producing means 302 are provided for reciprocating the elongated shaft means 292 and comprise a head portion 304 on the elongated shaft means 292 having a cam follower 306 rotatably mounted therein with spring means 308 located in a recess 310 in the member 238 and a recess 312 in the head portion 304 for urging the cam follower 306 against a barrel cam surface 314, illustrated in FIGS. 8, 10 and 11. A force applying plug portion 316 integral with the elongated shaft means 292 has a generally conical shaped outer surface 318 having its larger diameter 320 closer to the head portion 304 and its smaller diameter 322 at the free end portion thereof. As illustrated in FIG. 9, the plug portion 316 is spaced a short distance away from the movable fingers 268 of the expandable mandrel means 260 so that the expandable mandrel means 260 is in its non-expanded position. The movable fingers 268 are formed so that they have a natural tendency to resile into contact with each other so as to be normally in a non-expanded position. A guide roller means 324 is secured to the elongated shaft means 292 and is located between the walls 326 of a recess in the member 238 to prevent rotation of the elongated shaft means 292. An enlarged view of a portion of the cutting member 226 is illustrated in FIG. 9A and comprises a generally planar surface 330 which intersects the generally cylindrical inner surface 248 to form the cutting edge 228. A generally cylindrical inner surface 332 extends in a longitudinal direction away from the generally planar surface 330 and has a diameter greater than the diameter of the generally cylindrical inner surface 248 so as to form an annular recess for receiving the trimmed away portion 246.

As illustrated in FIG. 9, the can body 212 has a generally cylindrical outer surface 334 having a diameter that is slightly less than the diameter of the generally cylindrical inner surface 248. The cutting member 226 has a tapered portion 336 to facilitate entry of the can body 212 into the cutting member 226. Also, the can body 212 has a generally cylindrical inner surface 338 having a diameter that is slightly larger than a generally cylindrical outer surface 340 of the resilient, deformable object 230 on the expandable mandrel means 260. The resilient, deformable means 230 is provided with a tapered portion 342 to facilitate entry of the resilient, deformable object 230 into the can body 212. The cutting member 226 is secured to a portion 344 of the work station 208 to ensure it remains at a fixed location. FIG. 9 also illustrates that the rotatable cam follower 240 is threadedly mounted in the member 238.

Figure 10A:
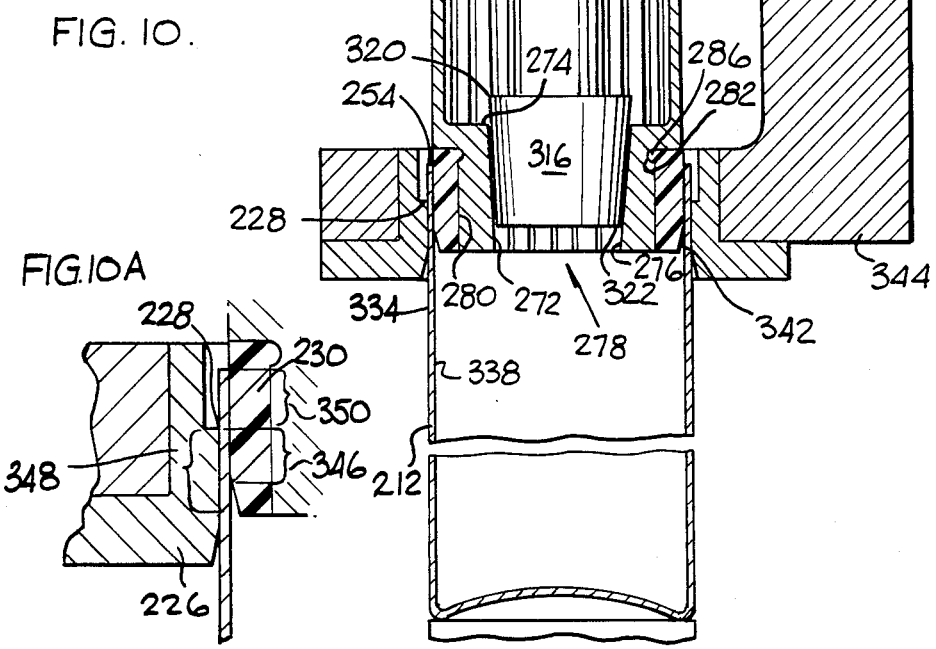
FIG. 10A is an enlarged view of a portion of FIG. 10.

As the starwheel 202 continues to rotate from right to left, as illustrated in FIG. 8, the cam follower 240 and the cam surfaces 244 function to move the member 238, the expandable mandrel means 260 and the resilient, deformable member 230 downwardly into the can body 212, as illustrated in FIGS. 10 and 10A, until a first part 346 of the resilient, deformable object 230 is radially opposite to an adjacent portion 348 which is next adjacent to the portion 246 of the can body 212 to be trimmed away and a second part 350 is radially opposite to the portion 246 to be trimmed away. During this rotation, the cam follower 306 and the cam surface 314 function to move the shaft means 292 and the plug portion 316 downwardly with the elongated member 234. The downward movement of the plug portion 316 is contained until the conical outer surface 318 thereof contacts the conical inner surface formed by the inner surfaces 272 of the movable fingers 268. Continued downward movement of the plug portion 316 applies radially outwardly directed forces on the inner surfaces 272 to expand the expandable mandrel means 260 and apply radially outwardly directed forces on the resilient, deformable object 230. The longitudinal length of each finger 268 is so much greater than the radial distance through which they are moved so that the radially outwardly directed forces that the expanding fingers 268 apply to the resilient, deformable object 230 are substantially uniform and have substantially no longitudinal component. The pivot points of the movable fingers 268 are located radially inwardly from the generally cylindrical surface 338 of the can body 212 and provide control means so that the radially outwardly directed forces are applied to the first part 346, as illustrated in FIG. 10A, before being applied to the second part 350 of the resilient, deformable object 230. As the radially outwardly directed forces are applied, the first part 346 initially expands and moves into contact with the adjacent portion 348 of the can body 212 so frictional forces exist between the first part 346 and the adjacent portion 348 to prevent longitudinal movement of the can body 212. Continued application of the radially outwardly directed forces applies sufficient force on the adjacent portion 348 to move it into contact with the generally cylindrical inner surface 248 of the cutting member 226 to ensure that the adjacent portion 348 is substantially perfectly round and ensure that there is no longitudinal movement of the can body 212.

As the starwheel 202 continues to rotate, the cam follower 306 and the cam surface 314 function to move the shaft means 292 and the plug portion 316 further into the movable fingers 268 to move them in a radially outwardly direction, as illustrated in FIG. 11. The continued movement applies additional radially outwardly directed forces on the first part 346 until it starts to deform in longitudinal directions. Also, the continued movement of the movable fingers 268 applies radially outwardly directed forces on the second part 350 and since deformation of the resilient, deformable object 230 in the longitudinal direction toward the base member 262 is limited by the radially outwardly extending surfaces 352, the second part 350 is moved radially outwardly to move the portion 246 over the cutting edge 228 so as to sever the portion 246 from the can body 212.

As the starwheel continues to rotate, the spring means 308 urges the cam follower 306 against the cam surface 314 so that the plug portion 316 is moved upwardly, as viewed in FIG. 11, away from its location in FIG. 11 to its location in FIG. 9. As the plug portion 316 is moved away from the movable fingers 268, they move back to the non-expanded position and the resilient, deformable object 230 resiles to its position illustrated in FIG. 9. The cam follower 240 and the cam surfaces 244 move the elongated member 234 upwardly to remove the resilient, deformable object 230 out of the trimmed can body 212. The trimmed can body is transferred from the work station 208 by suitable means (not shown) to a conveyor for further processing. Also, as the can body 212 is being moved out of its position within the cutting member 226, suitable means, such as an air nozzle (not shown) are provided to remove the trimmed portion 246 into a suitable scrap collector.

The taper of the conical outer surface 318 and the conical inner surface formed by the inner surface has been exaggerated for illustration purposes. When used in trimming away a portion of a can body 212 having a cylindrical outer diameter of about 2.50 inches and a wall thickness of about 0.007 inch, the larger diameter 320 of the conical outer surface 318 is about 1.375 inches and the smaller diameter 322 about 1.125 inches and the larger diameter 274 of the conical surface formed by the inner surfaces 272 is about 1.312 inches and the smaller diameter 276 about 1.062 inches. The longitudinal extent of each movable finger 268, when moved from a non-expanded position to an expanded position, moves through a distance of about 0.60 inches. The cylindrical inner surface 248 of the cutting member 226 has a diameter of about 1.875 inches and the cylindrical outer surface 334 of the can body 212 has a diameter of about 2.492 inches. The cylindrical inner surface 338 of the can body 212 has a diameter of about 2.478 inches and the cylindrical outer surface 340 of the resilient, deformable object 230 in a non-expanded position has a diameter of about 2.440 inches. The resilient, deformable object 230 is formed from urethane having a durometer of about 90 Shore A.

It is contemplated that the inventive concepts herein described may be variously otherwise embodied and it is intended that the appended claims be construed to include alternative embodiments of the invention except insofar as limited by the prior art.

What is claimed is:

1. Apparatus for trimming away a portion of a can body adjacent its open end comprising:
   a cutting member having an upper surface, a lower surface and an opening having a generally cylindrical inner surface extending therebetween;
   a generally circular cutting edge formed at the intersection of said generally cylindrical inner surface and said upper surface;
   support means for positioning a can body, said can body having an open end having an exposed top edge portion that remains exposed during said trimming operation, a closed end, generally cylindrical inner and outer surfaces and a longitudinal axis, within said cutting member so that the portion of said can body to be trimmed away projects upwardly from said upper surface of said cutting member toward said open end and the next adjacent portion of said can body below said portion that is to be trimmed away is radially opposite said generally cylindrical inner surface of said cutting member and said support means in contact with said closed end of said can body for supporting said can body in such position with no external force being applied to said portion of said can body to be trimmed away;
   a resilient, deformable object;
   an expandable mounting means having an outer surface on which said resilient, deformable object is mounted and a central opening extending at least partially therethrough;
   movement means for moving said expandable mounting means to a location within said can body so that a first part of said resilient, deformable object is radially opposite to said next adjacent portion of said can body and a second part of said resilient, deformable object is radially opposite to said portion of said can body to be trimmed away;
   force applying means mounted for movement into said central opening to apply radially outwardly directed forces on said expandable mounting means;
   moving means for moving said force applying means;
   control means for controlling said radially outwardly directed forces to act first on said first part of said resilient, deformable object to move said first part into contact with said next adjacent portion of said can body with sufficient force to prevent longitudinal movement of said can body; and
   said control means controlling said radially outwardly directed forces to act secondly on said second part of said resilient, deformable object to move said second part into contact with said portion of said can body to be trimmed away to move said portion to be trimmed away against and over said cutting edge with sufficient force so as to sever said portion of said can body to be trimmed away from said can body.

2. Apparatus as in claim 1 wherein said expandable mounting means comprises:
   a hollow elongated member having a longitudinal axis;

securing means for securing said hollow elongated member to said movement means;

said hollow elongated member comprising a base member having a plurality of movable fingers projecting outwardly therefrom in a longitudinal direction and pivotally connected to said base member so that each of said movable fingers may be pivoted relative to said base member;

said plurality of movable fingers, when said expandable mounting means is in a non-expanded position, having portions thereof in side-by-side contacting relationship;

said plurality of movable fingers terminating in an opening end and having a substantially continuous outer surface portion next adjacent to said open end;

said resilient, deformable object being mounted on said continuous outer surface portion;

said resilient, deformable object when mounted on said continuous outer surface portion and with said expandable mounting means in a non-expanded position having a generally cylindrical outer surface that has a diameter slightly smaller than the diameter of the generally cylindrical inner surface of said can body; and said pivotal connection of said plurality of movable fingers to said base member causing the portions of said movable fingers adjacent to said open end to be moved in generally radial directions a distance greater than any other portions of said movable fingers so that said movable fingers will apply said radially outwardly directed forces acting on said first part of said resilient, deformable object to move said first part into contact with said next adjacent portion of said can body to prevent longitudinal movement of said can body.

3. Apparatus as in claim 2 and further comprising:
retaining means for retaining said resilient, deformable object on said continuous outer surface portion.

4. Apparatus as in claim 3 wherein said retaining means comprises:
an arc of an annular groove in each of said movable fingers so that, when said expandable mounting means is in a non-expanded position, said plurality of fingers form a substantially continuous annular groove;
a continuous annular rib portion on said resilient, deformable object and projecting radially inwardly and seated in said annular groove.

5. Apparatus as in claim 4 and further comprising:
a generally cylindrical inner surface means projecting away from said upper surface in an axial direction; and
said generally cylindrical inner surface means having a diameter greater than the diameter of said generally cylindrical inner surface of said cutting member to form an annular cavity surrounding said portion to be trimmed away.

6. Apparatus as in claim 2 wherein:
said plurality of movable fingers having a generally conical inner surface when in said non-expanded position with the smaller diameter thereof at said open end;
said force applying means having a generally conical outer surface with the smaller diameter thereof facing the larger diameter of said generally conical inner surface of said plurality of movable fingers prior to movement into said central opening;

said smaller diameter of said generally conical outer surface being smaller than said larger diameter of said generally conical inner surface so that said force applying means may be readily moved into said central opening; and the larger diameter of said generally conical outer surface being larger than said smaller diameter of said generally conical inner surface so that as said force applying means are moved into said central opening, they will apply uniform radially, outwardly directed forces on said movable fingers.

7. Apparatus as in claim 6 and further comprising:
retaining means for retaining said resilient, deformable object on said continuous outer surface portion.

8. Apparatus as in claim 7 wherein said retaining means comprises:
an arc of an annular groove in each of said movable fingers so that, when said expandable mounting means is in a non-expanded position, said plurality of fingers form a substantially continuous annular groove; and
a continuous annular rib portion on said resilient, deformable object and projecting radially inwardly and seated in said annular groove.

9. Apparatus as in claim 8 and further comprising:
a generally cylindrical inner surface means projecting away from said upper surface in an axial direction; and
said generally cylindrical inner surface means having a diameter greater than the diameter of said generally cylindrical inner surface of said cutting member to form an annular cavity surrounding said portion to be trimmed away.

10. A method for trimming away a portion of a can body adjacent its open end comprising:
providing a cutting member having an upper surface, a lower surface and an opening having a generally cylindrical inner surface extending therebetween;
forming a generally circular cutting edge at the intersection of said generally cylindrical inner surface and said upper surface;
positioning a can body, having an open end having an exposed top edge portion that remains exposed during said trimming operation, a closed end, generally cylindrical inner and outer surfaces and a longitudinal axis within said cutting member so that the portion of said can body to be trimmed away projects upwardly from said upper surface toward said open end and the next adjacent portion of said can body is radially opposite said generally cylindrical inner surface and supporting said can body on supporting means so that said closed end of said can body is in contact with said supporting means to support said can body in such position with no external force being applied to said portion of said can body to be trimmed away;
mounting a resilient, deformable object on the outer surface of an expandable mounting means;
moving said expandable mounting means to a location within said can body so that a first part of said resilient, deformable object is radially opposite to said next adjacent portion of said can body and a second part of said resilient, deformable object is radially opposite to said portion of said can body to be trimmed away;

initially applying radially outwardly directed forces on said first part of said resilient, deformable object to move said first part against said next adjacent portion of said can body to prevent longitudinal movement of said can body; and thereafter applying radially outwardly directed forces on said second part of said resilient, deformable object to move said second part into contact with said portion of said can body to be trimmed away and to move said portion of said can body to be trimmed away against and over said cutting edge with sufficient force so as to sever said portion of said can body to be trimmed away from said can body.

11. Apparatus for trimming away a portion of a an body adjacent its open end comprising:

a cutting member having an upper surface, a lower surface and an opening having a generally cylindrical inner surface extending therebetween;

a generally circular cutting edge formed at the intersection of said generally cylindrical inner surface and said upper surface;

support means for positioning a can body, said can body having an open end having an exposed top edge portion that remains exposed during said trimming operation, a closed end, generally cylindrical inner and outer surfaces and a longitudinal axis, within said cutting member so that the portion of said can body to be trimmed away projects upwardly from said upper surface of said cutting member toward said open end and the next adjacent portion of said can body below said portion that is to be trimmed away is radially opposite said generally cylindrical inner surface of said cutting member and said support means in contact with said closed end of said can body for supporting said can body in such position with no external force being applied to said portion of said can body to be trimmed away;

a resilient, deformable object having a longitudinal extent and an outer surface;

mounting means on which said resilient, deformable object is mounted;

movement means for moving said mounting means to a location within said can body so that a first part of said resilient, deformable object is radially opposite to said next adjacent portion of said can body and a second part of said resilient, deformable object is radially opposite to said portion of said can body to be trimmed away;

force applying means for applying a force to said resilient, deformable object so as to move at least portions of said outer surface thereof in radially outward directions;

moving means for moving said force applying means;

control means for controlling said radially outwardly directed movement of said outer surface of said resilient, deformable object to act first on said first part of said resilient, deformable object to move said first part into contact with said next adjacent portion of said can body with sufficient force to prevent longitudinal movement of said can body; and said control means controlling said radially outwardly directed movement of said outer surface of said resilient, deformable object to act secondly on said second part of said resilient, deformable object to move said second part into contact with said portion of said can body to be trimmed away to move said portion of said can body to be trimmed away against and over said cutting edge with sufficient force so as to sever said portion of said can body to be trimmed away from said can body.

12. Apparatus as in claim 26 and further comprising:

said mounting means having a longitudinal axis;

said force applying means having a longitudinal axis;

said mounting means attached to said force applying means for movement therewith but for permitting relative longitudinal movement therebetween;

movement limiting means to stop the movement of said mounting means to position said resilient, deformable object within said can body so that portions of said resilient, deformable object are radially opposite to said portion of said can body to be trimmed away, said cutting edge and at least a substantial portion of said next adjacent portion of said can body that is radially opposite to said generally cylindrical inner surface of said cutting member;

said moving means continuing the movement of said force applying means in the same direction to apply a force in the same direction to deform said resilient, deformable object in radially outward directions to force said substantial portion of said next adjacent portion of said can body against said generally cylindrical inner surface of said cutting member so as to prevent longitudinal movement thereof and while longitudinal movement of said can body is being prevented, movement of said force applying means is continued in the same direction to force said portion of said can body projecting upwardly from said upper surface of said cutting member against and over said cutting edge to trim it from the can body; and said moving means moving said force applying means in a direction away from said can body and relative to said mounting means so that said resilient, deformable object will resile to its original shape and then moving said mounting means therewith so as to remove said mounting means out of said can body.

13. Apparatus as in claim 12 wherein:

said mounting means comprises an elongated rod having an enlarged head at one end thereof, said enlarged head being movable into and out of said can body;

said force applying means comprises a sleeve surrounding a portion of said elongated rod, said sleeve being in frictional engagement with said elongated rod to provide for said movement of said mounting means with said force applying means and permitting relative movement between said force applying means and said mounting means when said movement of said mounting means is stopped;

said resilient, deformable object mounted on said elongated rod and located between said enlarged head and said sleeve; and said moving means reciprocating said sleeve so as to move said enlarged head and said resilient, deformable object into and out of said can body and to apply said force to deform said resilient, deformable object.

14. Apparatus as in claim 13 and further comprising:

said enlarged head having a generally cylindrical outer surface;

said sleeve having a generally cylindrical outer surface with a diameter substantially equal to the diameter of said enlarged head;

said sleeve being spaced a distance from said enlarged head so as to form an annular cavity around said elongated rod;

said resilient, deformable object having a ring shaped configuration and having an outer diameter substantially equal to the outer diameter of said enlarged head and the diameter of said sleeve;

said resilient, deformable object being located in said annular cavity; and said resilient, deformable object comprising a urethane material.

15. Apparatus as in claim 14 wherein:

said diameter of said enlarged head and said diameter of said resilient, deformable object in said undeformed state are substantially equal to the inner diameter of said can body.

16. Apparatus as in claim 15 wherein:

said diameter of said generally cylindrical inner surface of said cutting member is substantially equal to the outer diameter of said can body.

17. Apparatus as in claim 16 and further comprising:

said sleeve having a conically shaped surface extending from an inner periphery thereof to an outer periphery thereof and facing said enlarged head with the smallest diameter of said conically shaped surface of said sleeve closer to said enlarged head;

said enlarged head having a conically shaped surface extending from an inner periphery thereof to an outer periphery thereof and facing said sleeve with the smallest diameter of said conically shaped surface of said enlarged head closer to said sleeve; and said resilient, deformable object having conically shaped surfaces conforming to and in contact with each of said conically shaped surfaces of said sleeve and said enlarged head.

18. Apparatus as in claim 17 wherein said resilient, deformable object comprises:

an inner ring shaped portion formed from urethane;

an outer ring shaped portion having an inner surface in contact with an outer surface of said inner ring shaped portion and formed from urethane; and said outer ring shaped portion having a durometer substantially greater than the durometer of said inner ring shaped portion.

19. Apparatus as in claim 16 and further comprising:

means for preventing rotation of said sleeve during said reciprocation thereof.

20. Apparatus as in claim 19 wherein said means for preventing rotation comprises:

a hollow cylinder surrounding said sleeve;

an elongated narrow opening in said hollow cylinder extending in a direction generally parallel to said longitudinal axis of said hollow cylinder;

an elongated narrow member mounted for sliding movement in said elongated narrow opening;

means for securing said cam follower to said elongated narrow member; and means for securing said elongated narrow member to said sleeve.

21. Apparatus as in claim 20 and further comprising:

means for moving said can body into and out of said supported desired location.

* * * * *